United States Patent [19]
Monk

[11] 4,161,942
[45] Jul. 24, 1979

[54] SOLAR ENERGY COLLECTOR

[76] Inventor: Robert J. Monk, 4640 Country Creek, Apt. 1255, Dallas, Tex. 75236

[21] Appl. No.: 864,617

[22] Filed: Dec. 27, 1977

[51] Int. Cl.² ............................................. F24J 3/02
[52] U.S. Cl. .................................. 126/271; 126/270; 350/295; 350/310
[58] Field of Search .............. 126/270, 271; 237/1 A; 60/641; 350/295, 310

[56] References Cited
U.S. PATENT DOCUMENTS

| | | | |
|---|---|---|---|
| 820,127 | 5/1906 | Pope | 126/271 |
| 2,460,482 | 2/1949 | Abbot | 126/271 |
| 2,674,693 | 4/1954 | Millett et al. | 126/270 |
| 3,406,404 | 10/1968 | Maier | 126/270 |
| 3,977,773 | 8/1976 | Hubbard | 126/270 |
| 3,993,528 | 11/1976 | Pauly | 126/270 |

*Primary Examiner*—James C. Yeung
*Attorney, Agent, or Firm*—Gerald G. Crutsinger; Larry B. Dwight

[57] ABSTRACT

A solar energy collector comprising a circular paraboloid mirror formed from a plurality of flexible reflective film strips stretched over a plurality of concentrically arranged support rings being arranged to position the film in a circular paraboloid. The support rings are supported by a plurality of trusses. The mirror is pivotally secured to a lower support assembly which is rotatably about an azimuth bearing and rotatable for elevation through a pivot point which passes through the mirror. The support rings are adjustable such that light rays striking the film between the support rings is reflected to the focal point of the mirror wherein a solar collector is located. The solar collector comprises a plurality of helically arranged tubes coated with a black composition of plaster of paris and carbon black to maximize collection of heat to the fluid passing through the tubes. The nest of tubes are hermetically sealed to minimize losses from convection.

11 Claims, 11 Drawing Figures

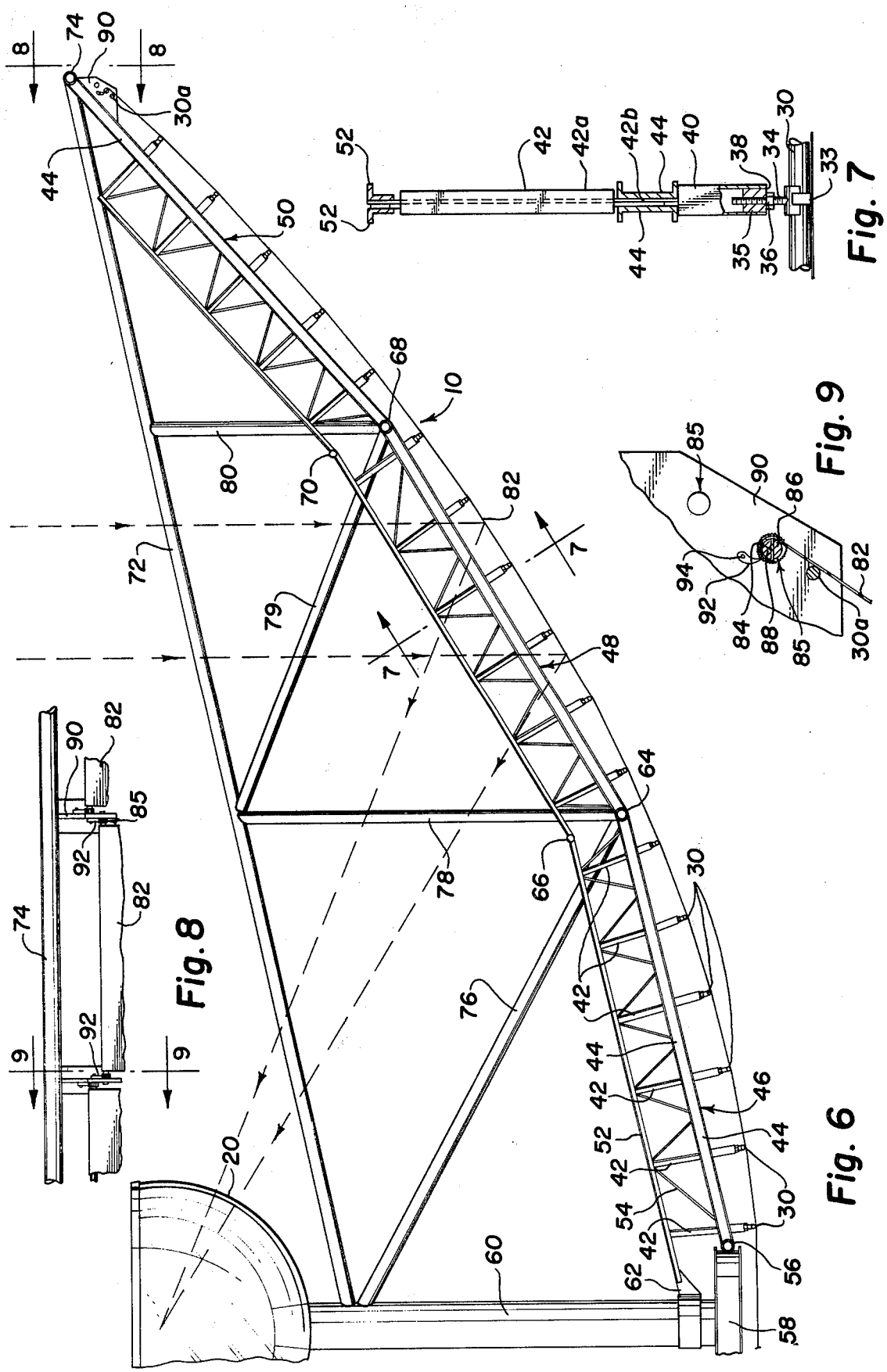

SOLAR ENERGY COLLECTOR

BACKGROUND

Because of shortages of fossil fuels and the hazards of nuclear fuels, solar energy has become a desirable source of fuel. However, one problem facing the collection and transfer of solar energy is the cost involved in building the collectors. Two types of collectors exist, the lens type which focuses light to a source and the reflective type of focus light to a source. Heretofore, reflectors have been built of aluminum, ceramics, and other costly type materials which require a large capitol investment to realize the suns potential energy.

Heretofore, there have been some temporary mirrors which have flexible support structure such that the mirror can be collapsed. However, these structures suffer from inaccurate alignment and reduced efficiency. In addition, these structures do not provide any means to adjust the tension of the reflective surface to compensate for changes in temperature.

SUMMARY OF THE INVENTION

I have devised a solar energy collector comprising a circular paraboloid mirror arranged to reflect light to a collector positioned at the focal point of the mirror. The mirror comprises a plurality of reflective film strips stretched over a frame formed a plurality of concentrically arranged support rings. The support rings are supported by heighth adjustment posts secured to a plurality of radially extending trusses which extend out from a central support post position along a line passing through the focal point of the mirror. The film is secured at each end around rotating axles which have a ratchet lock to limit rotation and control the tension of the film stretched over the concentric support rings. The rings are adjusted such that the light between the rings is reflected through the focal point of the mirror where the solar collector is located. The mirror is supported on an axes rotatably supported on a support assembly to control the elevation of the mirror. The support assembly is rotatable 360 degrees about an azimuth bearing to provide complete tracking of the sun as it crosses the sky.

The flexible reflective surface forms a highly reflective mirror which is readily cleanable and able to withstand atmospheric elements and yet is flexible to allow adjustment and positioning of the reflective film in such a way as to compensate for manufacturing tolerances in the frame and support structure.

The primary object of the invention is to provide a solar energy collector which is constructed of flexible reflective film to form the mirror to minimize manufacturing cost of the reflector.

A still further object of the invention is to provide a solar reflector which is constructed of inexpensive material which is flexible allowing adjustment of every segment of the reflective material to compensate for manufacturing tolerances which would otherwise require regrinding of a mirror constructed of conventional materials.

Other and further objects of the invention will become apparent upon referring to the detailed description hereinafter following and drawings annexed hereto.

BRIEF DESCRIPTION OF THE DRAWING

Drawings of a preferred embodiment of the invention are annexed hereto so that the invention may be better and more fully understood; in which:

FIG. 6 is a cross-sectional view taken along line 6—6 of FIG. 5;

FIG. 7 is an enlarged cross-sectional view taken along line 7—7 of FIG. 6.

FIG. 8 is an enlarged end view taken along line 8—8 of FIG. 6;

FIG. 9 is a cross-sectional view taken along line 9—9 of FIG. 8;

Numeral references are used to designate like elements throughout the various figures of the drawings.

DESCRIPTION OF A PREFERRED EMBODIMENT

Figure 1:
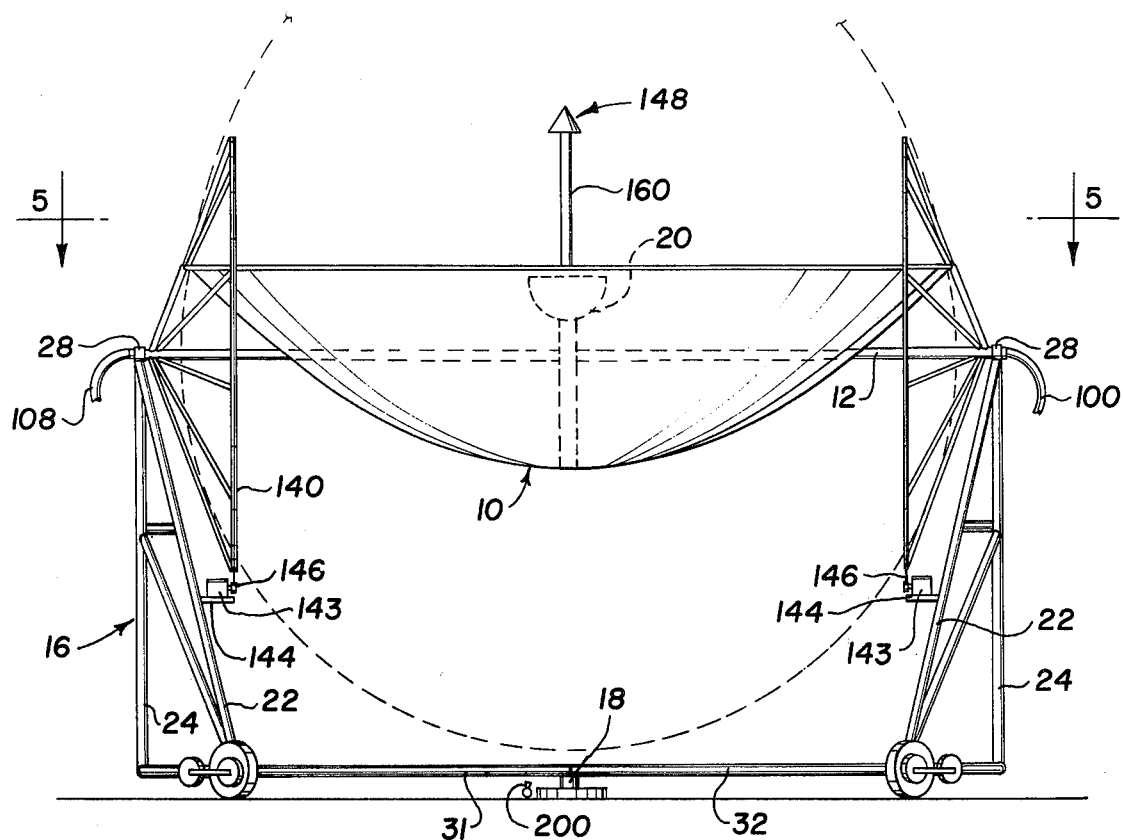
FIG. 1 is a front elevational view of the collector and support apparatus.
Figure 2:
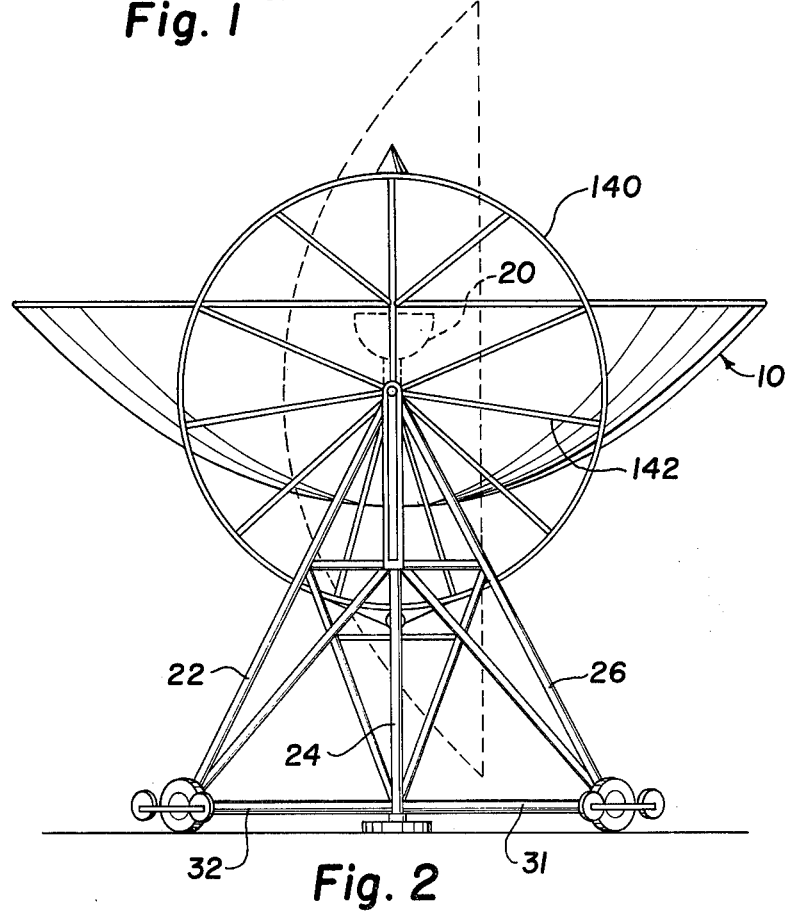
FIG. 2 is a right side elevational view.
Figure 3:
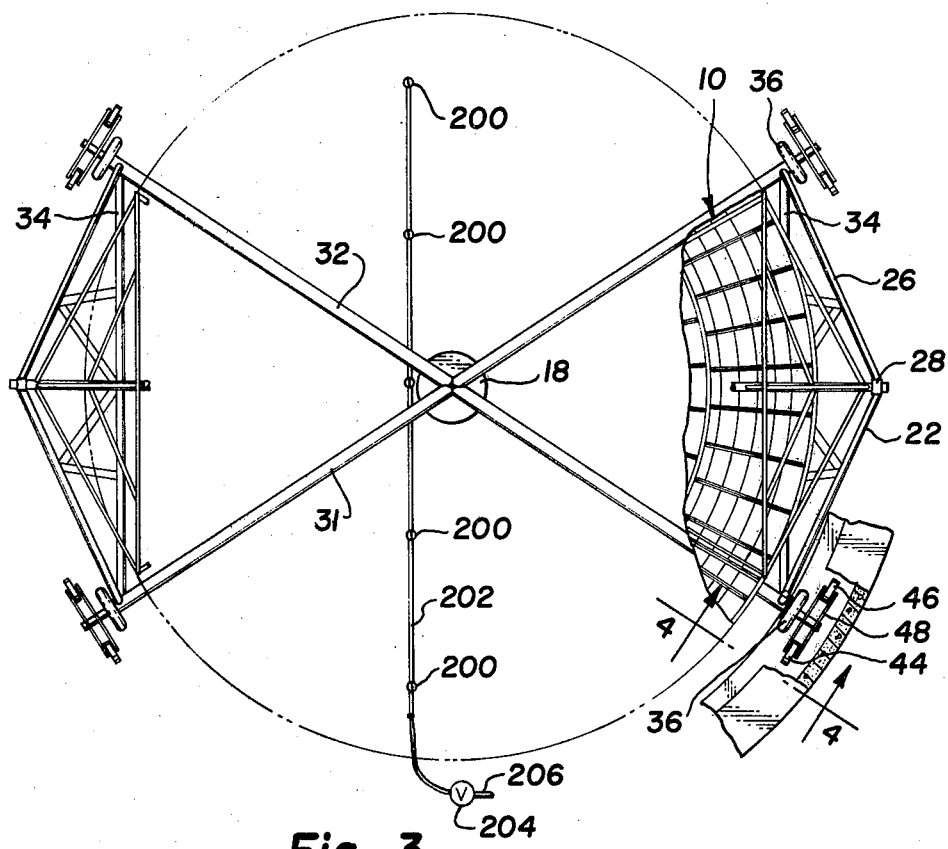
FIG. 3 is a plan view thereof.

Referring to FIGS. 1-3, the solar energy collector generally comprises a circular paraboloid shaped mirror 10 pivotally supported by shaft 12 which is pivotally secured to a lower support assembly generally designated 16. The support assembly 16 is pivotal about an azimuth bearing 18.

The circular paraboloid 10 reflects light toward the collector assembly 20 which is located at the focal point of the mirror.

Figure 4:
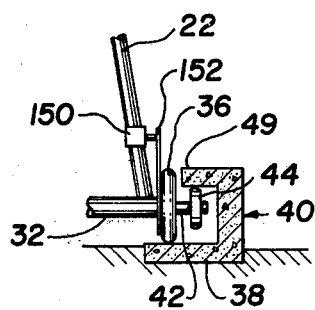
FIG. 4 is an enlarged cross-sectional view taken along line 4—4 of FIG. 3.
Figure 5:
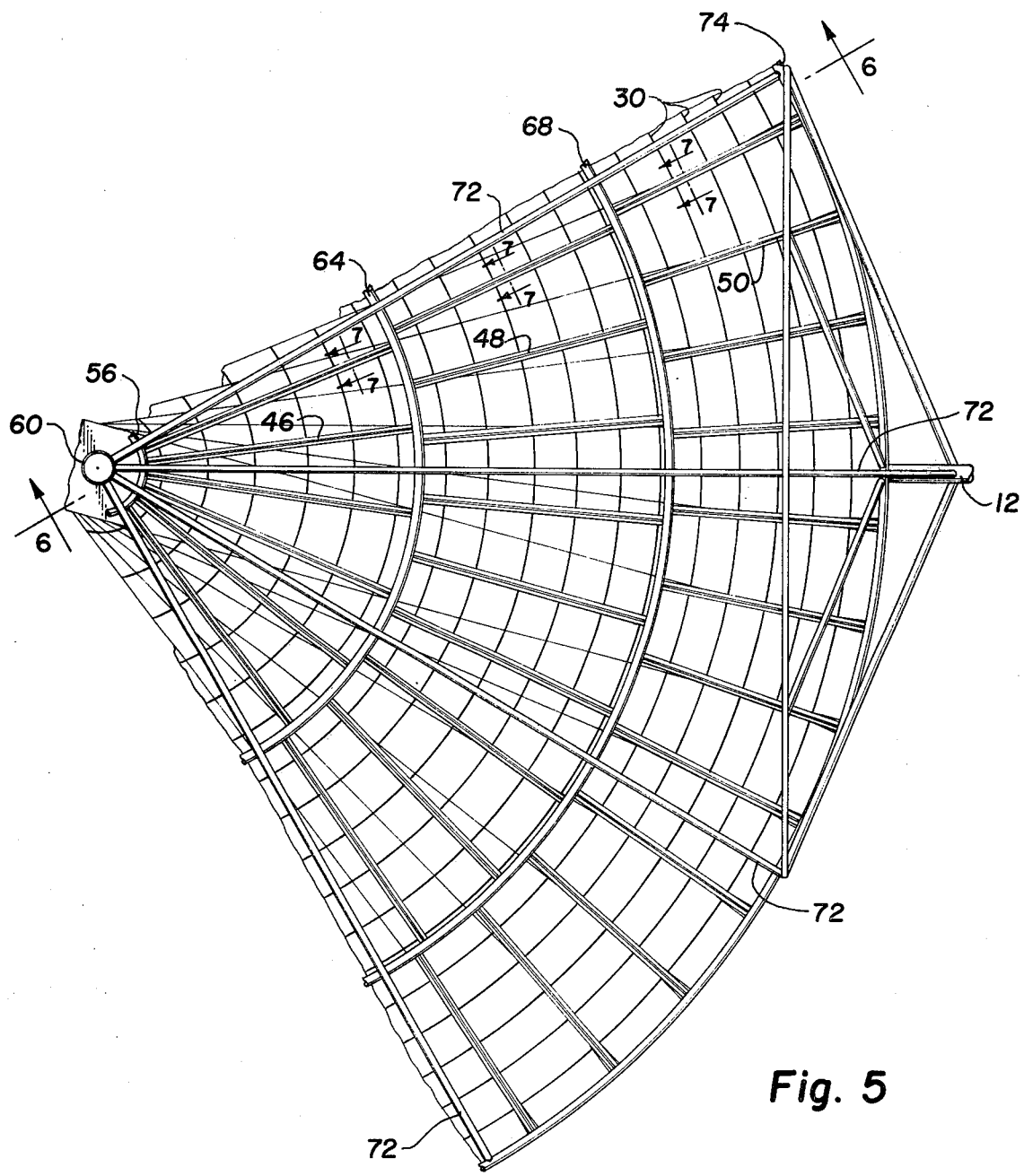
FIG. 5 is an enlarged view of a portion of the mirror and support structures with parts broken away to more clearly illustrate the details of construction.
Figure 10:
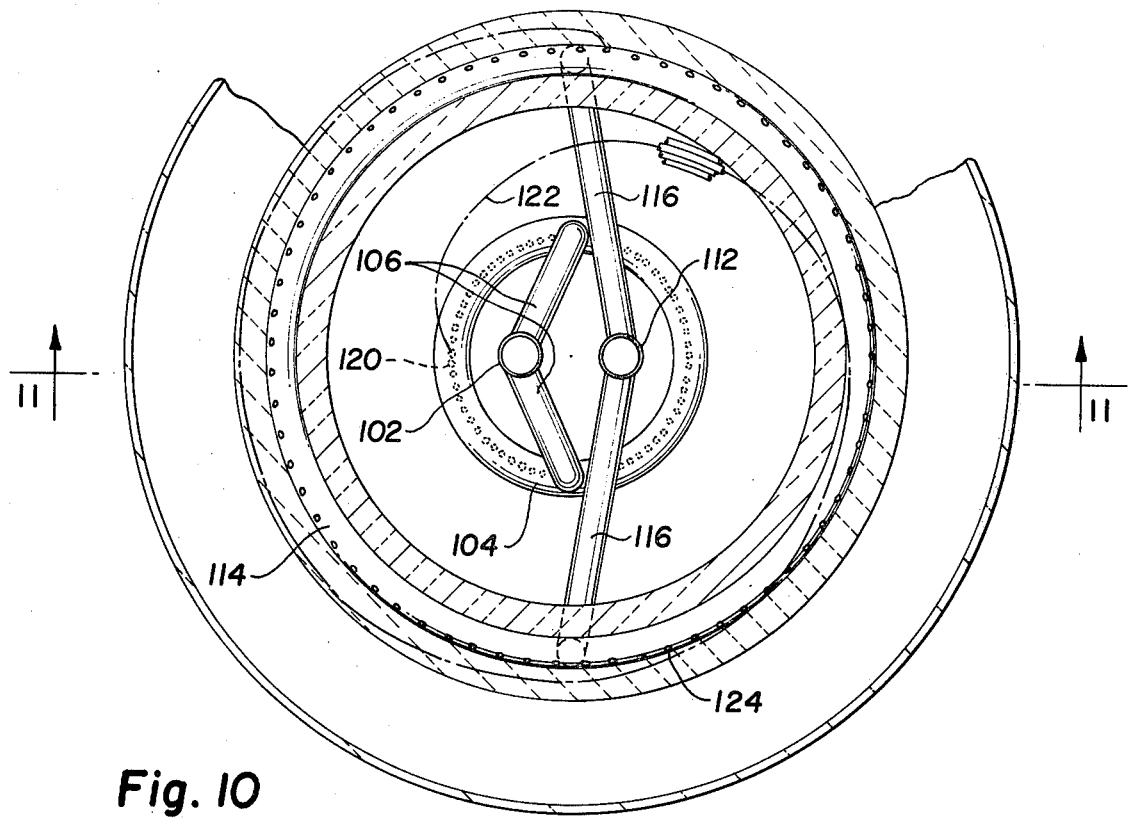
FIG. 10 is a cross-sectional view taken along line 10—10 of FIG. 6.
Figure 11:
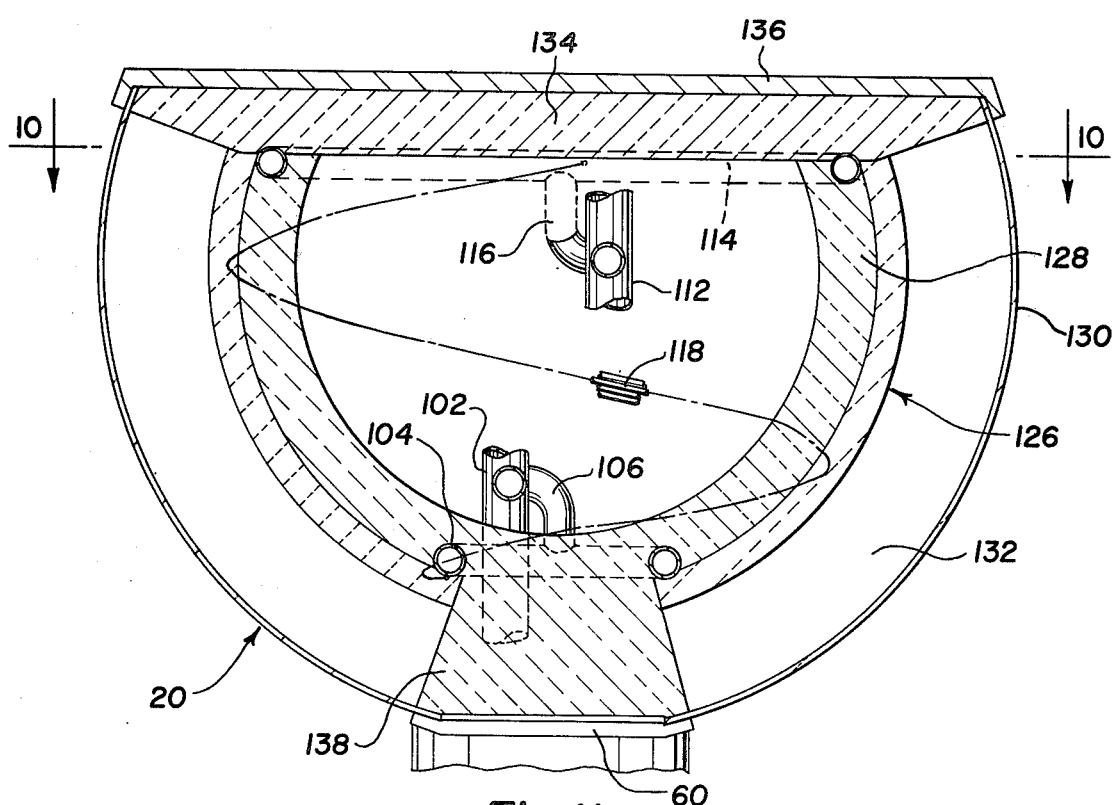
FIG. 11 is a cross-sectional view taken along line 11—11 of FIG. 10.

The support assembly 16 generally comprises upwardly extending support members 22, 24 and 26 arranged in a triangular configuration on each end of mirror 10. A bearing 28 is secured at the top apex of the frame to rotatably support shaft 12. Upwardly extending members 22, 24 and 26 are secured to each side of a lower frame comprised of two crossing axles 31 and 32 secured by connector member 34 at each end. The axles 31 and 32 are supported by bearing wheels 36 secured to the ends of each axle 31 and 32. As illustrated in FIGS. 3 and 4, bearing wheels 36 are supported by a flange 38 of guide channel 40. A stub shaft 42 rotatably supports a pair of guide wheels 44 and 46 secured by leaf springs 48 to stub shaft 42. The guide wheels 44 and 46 exert an upward force against channel flange 49 to limit upward movement of the lower support assembly 16.

The mirror frame is comprised of a network of concentrically arranged support rings 30. The rings 30 are secured by a plurality of clamps 33 to a plurality of screws 34 threadedly secured through an insert 35 having a threaded passage therethrough as best illustrated in FIG. 7. The screws 34 are spaced about the circumference of rings 30. Inserts 35 are secured in the lower end of hollow square channels 40. It should be readily apparent that by turning screws 34 in inserts 35, the relative distance between surface 38 and the surface of the ring 30 may be adjusted. Nuts 36 lock the screws 34 in position. An outer support ring 30a is secured in fixed position to brackets 90 secured to lower beams 44 of trusses 50.

The hollow square channels 40 receive the stem and flange of a T-shaped members 42. Flange 42a of members 42 have a portion thereof removed so that the stem 42b is positioned between the webs of two C-shaped channel members 44 of three sets bar joist trusses 46, 48, and 50 which form the primary radial support for the rings 30.

The bar joint trusses 46, 48 and 50 generally extending radially outwardly in staggered spaced relation and generally comprising a C-shaped channel 44 along the bottom which resists loading from the bottom of the mirror 10. A pair of L-shaped angles 52 are secured to the stem 42b of member 42 to provide the tension members of the truss. A zig zag bar 54 is welded or otherwise secured to the trusses 46, 48 and 50 to brace the trusses.

Trusses 46 have channel members 44 secured to a large connector ring 56 secured to beams 58 secured to the lower end of upwardly extending support member 60. The upper angles 52 are secured by bracket 62 to the upwardly extending support member 60. Trusses 46 are secured between ring 56 and bracket 62 to a second pair of spaced rings 64 and 66 in spaced intervals of 15 degrees. Trusses 48 are secured between rings 64 and 66 and rings 68 and 70 in spaced intervals of 10 degrees. Trusses 50 are secured between rings 68 and 70 and outer ring 74 and radially upper support 72 in spaced intervals of 7½ degrees. Braces 76, 78, 79 and 80 are secured between the upwardly extending support member 60, support rings 64 and 68 and the radially extending support members 72.

The upwardly extending support member 60 supports the solar collector 20 and the focal point of the mirror 10. Rings 30 are adjusted such that the area between any pair of the rings 30 will reflect the light from the incoming sun's rays shown in dashed outline to the focal point of the mirror or the solar collector 20. The reflective surface of the mirror 10 is formed by a flexible reflective film 82 such as that sold under the trademark "530 Spring Film" a trademark of 3M Company of Minnesota. The flexible reflective film 82 is inexpensive and has a highly reflective surface which renders the surface easily adjustable. The film 82 generally comes in specified widths such as two feet and is generally long enough to go from one side of circular paraboloid mirror 10 to the other. It should be readily apparent that a number of strips of film 82 are used between rollers 85 spaced around the circumference of circular paraboloid mirror 10. The number of strips of film 82 is determined by the circumference of circular baraboloid mirror 10.

The first end 84 of film 82 is secured between segments 86 and 88 of roller 85 which are journalled through apertures formed in support plates 90 secured between the two C-channels 44. The film 82 is stretched over rings 30 and ring 30a to the opposite side of circular paraboloid mirror 10 to another set of split rollers 85 diammetrically opposed to where the first end 84 is secured therein. Teeth are formed on the ends of rollers 85 such that rotation of rollers 85 will engage rachet lock 92 pivotally secured on pin 94 to brackets 90 to prevent unwinding of rollers 85. This provides a means to control the tension of the film 82 over rings 30 and therefore controls the amount of wind load which the mirror 10 can receive from the reflective side of film 82. It should be readily apparent that the reflective side of the film 82 will be positioned against the rings 30 such that light is reflected toward the solar collector 20. The film 82 may be strengthened by securing a flexible backing material such as mylar to the non-reflective side of the film.

A flexible conduit 100 provides the inlet line for carrying the heat transfer media to the solar collector 20. Fluid passes through flexible conduit 100 positioned through shaft 12, through the central support member 60 and up to solar collector 20. Supply tube 102 communicates with flexible line 100 and inlet manifold 104 through lines 106. A flexible exhaust line 108 is secured in a similar manner through shaft 12 through upwardly extending member 60 to outlet tube 112 which communicates with exhaust manifold 114 through lines 116.

Inlet manifold 104 communicates with outlet manifold 114 through a plurality of helically arranged copper tubes 118 which are secured in apertures 120 formed in inlet manifold 104 and spiral round in a helical path similar to that shown in dashed outline 122 and communicate with apertures 124 formed in outlet manifold 114. The tubes 118 are nested as closely as possible as allowed by manufacturing tolerances. Only a portion of the tubes 118 are illustrated but all the tubes follow the path shown in dashed outline. The tubes 118 form a semispherical heat transfer layer 126 which is coated with a compound of plaster of paris and carbon black to form a heat transfer agent which absorbs all the light and radiant energy and transfers the heat to the tubes through which the heat transfer media is passing. A layer of insulation 128 is formed on the interior side of the heat transfer layer 126 to minimize heat losses. A transparent lens 130 provides a cover and a vacuum formed in the space 132 between the transparent lens 130 and heat absorbing layer 126. An insulating cover 134 is formed just under a cover 136 which protects the top from weather elements. A base 138 is secured to upwardly extending member 60 to support the solar collector 20.

Means to control the elevation of the mirror 10 generally comprises a ring 140 supported by spoke 142 on shaft 12. A motor 143 is secured on a support member 144 to support legs 22 and 26 on each end of support assembly 16 and is secured by a sprocket chain or other connector means 146 to the ring 140. A guidance system 148 to be more fully explained hereinafter will actuate reversible motor 143 to rotate shaft 12 and thereby change the elevation of mirror 10. As is illustrated in FIG. 2 in dashed outline the mirror is capable of rotating 360 degrees. Means to change the azimuth bearing of the mirror to provide complete tracking comprises reversible motor 150 secured to struts 22 and 26 and drivingly connected by sprocket chain 152 to wheels 36 as illustrated in FIG. 4. The motors 150 are simultaneously activated by control circuit to provide accurate tracking of the sun across the sky to maximize light reflectance to the solar collector 20.

The guidance system sensor 148 is mounted on staff 160 and is a system generally arranged to maintain the center of the mirror pointed toward the sun such as the various systems for tracking well known in the art. The heat transfer media is pumped into storage tanks or some other various devices which can utilize the heated media to perform the desired task to use the solar collector.

Means to clean the surface of the mirror 10 comprises a plurality of spaced spray heads 200 connected to a supply conduit 202. Supply conduit 202 is connected to control valve 204 which is connected by line 206 to a source of cleaning fluid such as water. At night the mirror 10 is turned down by rotating ring 140 and as the mirror 10 is rotated about azimuth bearing 18 water is sprayed on the film 82 to clean same. A timing circuit (not shown) can rotate the mirror 10 to a position to receive the morning sun and intermittantly spray the film 82 to clean same.

Having described my invention, I claim:

1. A solar energy collection device for heating a heat transfer media comprising: a plurality of concentrically arranged rings, said rings forming a circular paraboloid shaped frame; support means rotatably supporting said circular paraboloid frame; means adjustably supporting said rings to said support means; a plurality of strips of reflective film, said strips being positioned across said rings from the outer ring of said circular paraboloid frame to the opposite side of said ring through the center of the frame, said reflective film further arranged to form a mirror surface to reflect sun's incoming light rays to a focal point; means to adjust the tension of said reflective film strips; and a solar collector secured at the focal point of said mirror and adapted to transfer heat to a media flowing therethrough.

2. The combination called for in claim 1 wherein the collector comprises a plurality of tubes arranged in the helical path to form a semi-spherical surface; an inlet manifold, one end of said tubes communicating with said inlet manifold; an outlet manifold the other end of said tubes communicating with the outlet manifold; insulation material secured on the inner surface of said tubes; a heat transfer coating secured over said tubes; a transparent lens spaced from the semi-spherical surface formed by said tubes to prevent heat loss, and a cover secured over the upper end of said lens.

3. The combination called for in claim 2 wherein the heat transfer coating comprises: a composition of carbon black and plaster of paris.

4. The combination called for in claim 1 wherein the means adjustably supporting said rings comprises: a plurality of threaded shafts secured at spaced intervals about the circumference of said rings; and means to move said threaded shaft relative to said support means.

5. The combination called for in claim 1 wherein the support means comprises: a center support post; a plurality of radially extending members secured between said center support post and said outermost ring; a shaft rigidly secured to one or more of said radially extending members; a lower support frame; and bearing means rotatively supporting said shaft on said lower support frame.

6. The combination called for in claim 1 with the addition of: means to clean the surface of the mirror comprising a source of cleaning fluid; conduit communicating with a source of cleaning fluid; and spray heads communicating with said conduit adapted to spray the cleaning fluid on the surface of the mirror when it is inverted and being rotated about the azimuth bearing.

7. The solar energy collection device for heating the heat transfer media comprising: a plurality of concentrically arranged support rings, said support rings forming circular paraboloid shaped frame; radially extending support means supporting said support rings; shaft means secured to said support means to rotatably support said circular paraboloid frames; means supporting said shaft means and adapted to rotate about a single pivot means; means to adjust the distance between said support ring and said radially extending support means; a plurality of reflective film strips secured across said support rings through the center of said circular paraboloid shaped frame to form a reflective surface of the mirror; means to adjustably secure said reflective film strips to said support rings, said means being positioned on the outermost support ring; and a solar collector secured at the focal point of said mirror and adapted to transfer heat to the media flowing therethrough.

8. The combination called for in claim 7 wherein the radially extending support means comprises the plurality of radially extending trusses; a center support post secured to one end of said trusses; and an outer support ring secured to the other end of said trusses.

9. The combination called in claim 7 wherein the means to adjustably support said rings relative to said radially extending support means comprises: a plurality threaded shaft secured to said support rings; a plurality threaded openings in said radially extending support means adapted to receive said threaded shafts such that the distance between the radially extending support means and the support rings may be adjusted by turning said threaded shaft.

10. The combination called for in claim 7 wherein means to support said shaft means comprises: a triangular shaped frame secured on each end of said shaft; roller means secured to the lower end of said triangularly shaped frame; and a circular shaped track having a center corresponding to the center of the mirror adapted to receive said roller means such that the entire mirror may rotate about the pivot point.

11. The combination called for in claim 10 with the addition of: a motor; means drivingly connecting said motors; and roller means to rotate said roller means to pivot said mirror about said pivot point.

* * * * *